United States Patent [19]

Dupont

[11] Patent Number: 5,299,408
[45] Date of Patent: Apr. 5, 1994

[54] WINE RECORKING APPARATUS AND METHOD

[75] Inventor: Albert Dupont, Novato, Calif.

[73] Assignee: Wine Recorker, Inc., Novato, Calif.

[21] Appl. No.: 754,332

[22] Filed: Sep. 4, 1991

Related U.S. Application Data

[63] Continuation of Ser. No. 522,347, May 11, 1990, abandoned.

[51] Int. Cl.$^5$ .............................................. B65B 31/06
[52] U.S. Cl. ....................................... 53/432; 53/109; 53/468; 53/471; 53/510; 53/381.4
[58] Field of Search ........................................... 53/381.4

[56] References Cited

U.S. PATENT DOCUMENTS

| | | | |
|---|---|---|---|
| 1,770,379 | 7/1930 | Young | 53/110 X |
| 2,337,170 | 12/1943 | Wareham | 53/109 |
| 2,763,107 | 9/1956 | Day | 53/110 X |
| 2,931,147 | 4/1960 | Barnby | 53/381 A |
| 3,035,886 | 5/1962 | Hickey | 53/425 X |
| 3,078,008 | 2/1963 | MacDonald | 53/510 X |
| 3,477,192 | 11/1969 | Brown et al. | 53/471 X |
| 3,564,805 | 2/1971 | Mumford | 53/381 A X |
| 3,670,786 | 6/1972 | Levin et al. | 53/110 X |
| 3,719,023 | 3/1973 | Richardson | 53/109 X |
| 3,875,853 | 4/1975 | Pielkenrood | |
| 3,911,640 | 10/1975 | Rausing | 53/110 X |
| 4,100,847 | 7/1978 | Norton | |
| 4,363,203 | 12/1982 | Marshall et al. | 53/381 A X |
| 4,363,338 | 12/1982 | Brown | 53/381 A X |
| 4,611,687 | 9/1986 | Nixon | |
| 4,667,580 | 5/1987 | Wetzel | |
| 4,693,175 | 9/1987 | Hashimoto | |
| 4,694,736 | 9/1987 | Yamagata et al. | |
| 4,699,640 | 10/1987 | Suzuki et al. | |
| 4,747,341 | 5/1988 | Hedrick | |
| 4,854,224 | 8/1989 | Hirayama | |
| 4,873,914 | 10/1989 | Hirayama | |
| 4,905,454 | 3/1990 | Sanfilippo et al. | 53/432 |

*Primary Examiner*—John Sipos
*Attorney, Agent, or Firm*—Townsend and Townsend Khourie and Crew

[57] ABSTRACT

An apparatus for processing one or more wine bottles to extract and replace corks safely. Specifically, a compartment segregates a first volume from a second volume and contains wine processing tools. Introduction of an inert gas to the first volume displaces oxygen from the first volume. An oxygen meter monitors levels of oxygen to allowing an operator to reduce the oxygen level below a predetermined level before start of processing. An operator uses the wine processing tools placed within the compartment directly by placing their hands and arms through apertures into elastomer gloves. The wine processing tools include a cork extractor, wine filling funnel and a cork inserting apparatus. The processing is all carried out within the inert atmosphere allowing an efficient, economical and safe cork extraction and insertion without promotion of oxidization of the wine.

18 Claims, 1 Drawing Sheet

WINE RECORKING APPARATUS AND METHOD

This is a continuation of Ser. No. 07/522,347, filed May 11, 1990, now abandoned.

BACKGROUND OF THE INVENTION

The present invention relates to a removal and insertion of a container seal. Specifically, the present invention relates to an apparatus and method for extraction and insertion of a cork into a wine bottle in the presence of a non-oxidizing atmosphere.

It has long been a practice to age fine vintage bottled wines allowing them to mature in flavor and gain in value for a hundred years or more. Unfortunately, the corks used to seal the bottles containing the wine may have lifetimes no more than twenty to twenty-five years. After this twenty to twenty-five year period, the corks begin to decompose, permitting oxygen contained within the air to enter the bottle. The oxygen begins an irreversible oxidation of the wine which can make it virtually valueless.

To lengthen the life of a wine sealed in a bottle that may have a decomposing cork, conventional recorking steps replace an old cork. The conventional steps include cork extraction, wine sampling and cork insertion. The wine sampling tests for wine degradation occurring during previous storage. Conventional recorkers perform these steps in ambient conditions with the atmosphere intermixing with the wine. Thus, today's recorking techniques also expose the wine to the oxidizing effects of oxygen contained within the air. Cork extraction the conventional way expose the wine to oxidation.

Pouring the wine from the bottle into a decanter for sampling compounds the exposure of the wine during recorking. Topping the wine to compensate for losses sustained during storage, presents air to the wine once again. The process of topping the wine entrains the oxygen-laden air as it enters the wine bottle. The oxygen laden wine mixes with the bulk of the wine contained within the bottle, increasing the risk of future degradation of the wine.

Even though conventional methods pose risks, recorkers still use these steps because decomposition of the cork permits oxygen to enter and cause oxidation of the stored wine.

Certain prior art wine treatments have included a nitrogen type process which evacuates oxygen remaining in a recorked wine bottle in the space between the cork and the wine. This nitrogen process removes the hostile environment from the presence of the wine to reduce the chance of oxidation.

As a wine ages, it grows more valuable while becoming weaker. Recorking older wine is riskier because it is more valuable and the weakened wine becomes increasingly susceptible to the oxidizing effects of oxygen introduced during the recorking steps. When the oxygen entrained wine mixes with the bulk of the wine, oxygen remains intermixed in the wine, which the nitrogen process cannot remove. Storage of the wine with this intermixture of oxygen can cause its oxidation.

SUMMARY OF THE INVENTION

The present invention extracts a cork from a wine bottle and reinserts it in such matter as to avoid the risk of oxidation. The invention includes cork extracting and recorking apparatus contained within a compartment that forms a controlled environment in which to conduct the recorking procedure. The apparatus includes means for displacing the oxygen with an inert gas to produce a recorking environment that is not hostile to the wine.

The invention offers several advantages over the prior art by providing safe recorking procedures in an environment which does not promote oxidation risk to the wine. The present invention is also useful to recork bottles having undamaged corks after sampling the wine within to be sure of the wine's integrity before shipment to customers. The sampling does not adversely impact upon a length of time the customer may store the wine and the shipper is confident there has been no oxidation of the wine.

According to one aspect of the invention, an enclosure forms a compartment segregating a first volume within the compartment from a second volume outside the compartment. An inert gas displaces oxygen from the first volume. An oxygen meter permits an operator to watch the displacement of oxygen and to be sure the oxygen level is below a predetermined level within the compartment. Inside the compartment, arrangement of specific tools at processing stations allows efficient and effective processing steps. These steps include: cork extracting, wine sampling, cleaning, topping, and cork inserting within the oxygen-free environment.

The invention permits safe cork extraction and insertion for a fine vintage bottled wine by preventing oxygen exposure during processing. The reader will realize a further understanding of the nature and advantages of the invention by reference to the remaining portions of the specification and to the drawings.

DESCRIPTION OF SPECIFIC EMBODIMENT

Figure 1:
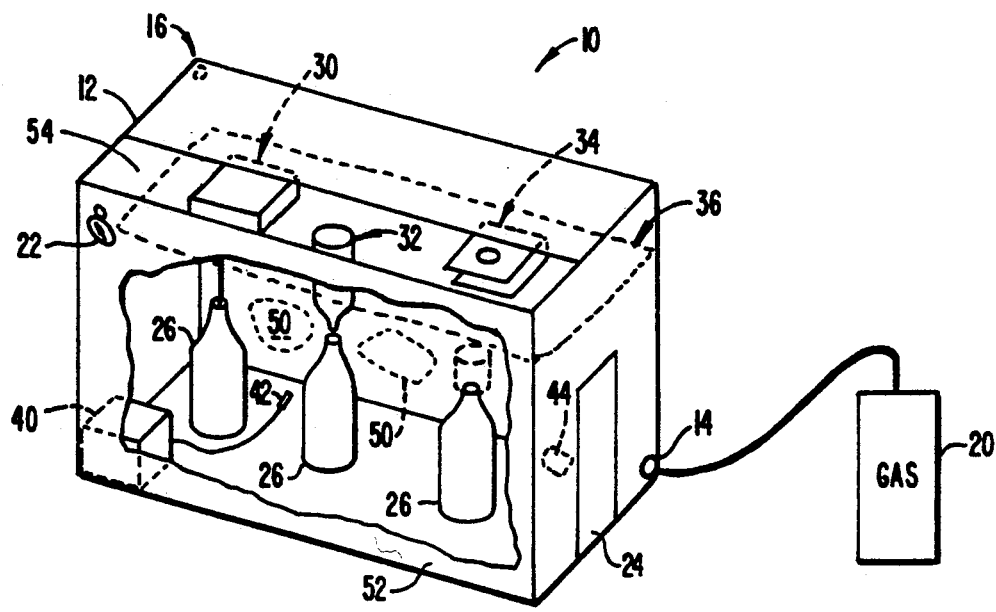
FIG. 1 is a compartment according to a preferred embodiment of the present invention.

FIG. 1 is a preferred embodiment of a corked container processing apparatus 10. Processing apparatus 10 includes a compartment 12 segregating a first volume contained within the compartment 12 from a second volume outside the compartment 12. A first valve 14 and a second valve 16 control the atmosphere of the first volume of the compartment 12. A gas container 20 provides a source of inert gas to the first valve 14. Inert gas in this context refers to a gas that is harmless when exposed to wine. This gas may be any of the type which does not promote oxidation of the wine when it contacts the wine. One such type of inert gas is Aligal ®, a registered trademark of Air Liquide Corporation. Aligal ® is a combination of carbon dioxide and nitrogen with the ratio being about 20% carbon dioxide and about 80% nitrogen. Use of pure nitrogen is possible, but it tends to remove natural $CO_2$ from the wine. Therefore, the preferred embodiment uses a combination of nitrogen and carbon dioxide. An oxygen meter monitors an amount of oxygen which remains within the first volume of the compartment 12. A door 24 in the compartment 12 permits placement of one or more wine bottles 26 into the first volume for processing in accord with the present invention. A plurality of processing tools within the first volume include a cork extractor 30, a filling/straining funnel 32 and a cork inserting apparatus 34. These processing tools depend from an adjustable mounting platform 36. The platform 36 is adjustable in height, permitting placement of bottles 26 beneath each of these processing tools. A vacuum pump 40 having a vacuum wand 42 cleans debris from within a bottle 26. Apertures 50 in a front panel 52 of the compartment 12 permit an operator to insert their hands within elastomer gloves (not shown). The gloves permit direct manipulation of the processing tools and wine bottles during operation. A transparent viewing panel 54 enables the operator to see the tools and the wine bottles during the processing. Making the entire compartment transparent allows an operator to closely manage all processing steps.

Figure 2:
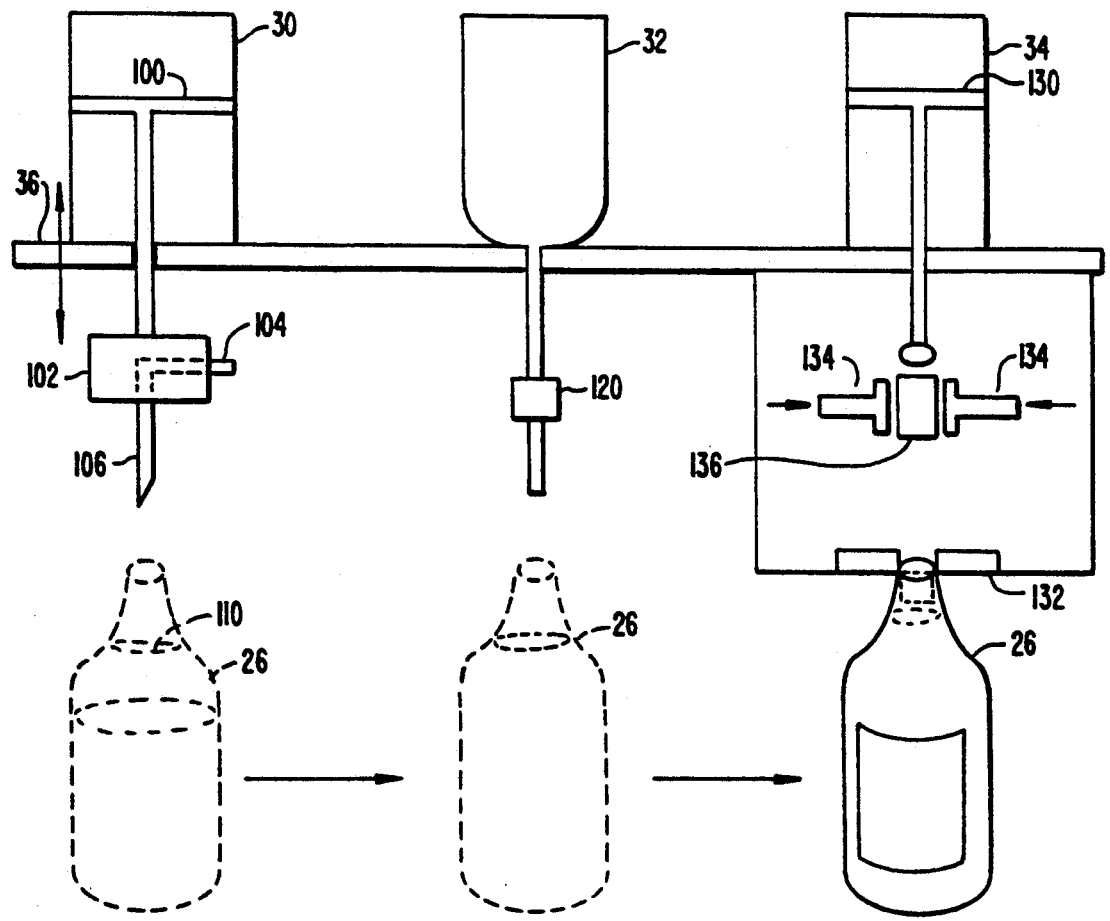
FIG. 2 is a detail showing an arrangement of implements used within compartment of FIG. 1.

FIG. 2 is a detailed view of the cork extractor 30, the fill funnel 32 and the cork inserting apparatus 34 depending from the platform 36. The cork extractor 30 includes a pneumatically driven piston 100 which has a depending block 102. An inert gas, such as the Aligal ®, operates the piston. Block 102 includes a valve 104 coupled to a hollow needle 106. Hollow needle 106 either pierces a cork 110 or slips between the cork 110 and a neck of the bottle 26.

The fill funnel 32 includes a valve 120 which is an on/off toggle controlling a flow of liquid contained within the funnel 32 into a bottle 26. Fill funnel 32 may include a fine mesh to remove foreign debris present in the wine or wine bottle.

An inert gas also pneumatically drives the cork inserting apparatus 34. The inserting apparatus includes a piston 130 coupled to an adapter 132. The adapter 132 permits variation of the type of bottle 26 which can have a cork inserted. Compression rams 134 squeeze a new cork 136 to allow insertion into bottle 26. Cork inserting apparatus 34 is conventional and substitutions are possible. Operation of piston 130 will drive a compressed new cork 136 placed within the cork inserting apparatus 34 into bottle 26.

Operation

Please refer to both FIG. 1 and FIG. 2 during the description of the cork processing apparatus operation. First, an operator places a plurality of wine bottles 26 within the first volume of compartment 12 by use of door 24. Sealing the door 24 and operating the first valve 14 as an inlet valve and the second valve 16 as an outlet valve permits displacement of the oxygen within the compartment 12. Aligal ® flows from the gas container 20 into the first volume of the compartment 12, displacing any oxygen. Aligal ® displaces oxygen because it is heavier than air and forces oxygen out of the top through the second valve 16.

The oxygen meter 22 allows the operator to determine when processing can start by signalling when the Aligal ® displacement has reached a predetermined value. Preferably, the oxygen remaining within the first volume is less than about 0.4%. The present invention permits displacement to about 0.1% oxygen or less.

To begin processing, an operator places their hands within the apertures 50 and positions a first bottle 26 below the cork extractor 30. A first control valve, not shown, permits pressurized gas to drive piston 100 of the cork extractor 30 toward bottle 26. The hollow needle 106 coupled to the piston 100 pierces cork 110 all the way through. Flowing a pressurized inert gas through valve 104 into the space between the cork 110 and the wine within the bottle 26 forces cork 110 out of the bottle 26. This extracts the cork 110.

Cleaning and topping the bottle 26 occurs next at the cleaning/refilling station under the filling funnel 32. Vacuum wand 42 cleans cork debris from the neck of the bottle. Addition of wine from the fill funnel 32 by operation of the valve 120 tops it to a desired level. Toggle 120 controls the topping of the wine into the bottle 26 accurately and precisely. If debris is present in the wine, addition of the mesh to fill funnel 32 permits removal of these solids. In some cases, the operator desires to sample the wine before filling and corking to be sure of the wine's integrity. Use of a conventional wine thief (not shown) permits the operator to sample the wine free from harmful exposure to oxygen. The bottle 26 is clean and filed to its proper level.

Use of the inserting apparatus 34 inserts the new cork 136 into the bottle 26. Securing inserting apparatus 34 with an adapter 132 corresponding to a particular type of bottle 26 enables insertion of the cork 136. Appropriate adapter 132 enables insertion of corks into any bottle types. The compression rams 134 squeeze the new cork 136 to permit cork insertion.

Operation of piston 130 drives the compressed cork 136 into the bottle 26. A second control valve, not shown, controls a flow of a pressurized inert gas which forces a ram coupled to the piston against the cork 136. Adapter 132 and compression rams 134 guide the compressed cork into the neck of the bottle 26. Inserting apparatus 34 inserts the new cork 136 into the bottle 26 without oxygen being present.

The operator similarly processes any other bottles 6 within the first volume until complete. During intervals described above when a bottle 26 has its cork 110 extracted, the operator periodically monitors oxygen meter 22. The operator checks oxygen meter 22 to be sure that the environment within the first volume of the compartment 12 remains inert. This avoids any risk of potential degrading exposure of the vulnerable wine to oxygen. Provision of additional tools within the compartment 12 may enhance this above described procedure. These additional tools include easily insertable plastic corks should emergency corking be necessary, extra bottles, and manual tools corresponding to the pneumatic tools if the pneumatic system fails. Convenient operation follows from allowing enough space for holding and processing an entire case at one time. Safety concerns suggest a use of stainless steel bins to hold bottles before and after processing. The stainless steel bins reduce a chance that a shattering of one bottle during processing would damage other bottles within the compartment. A bottle may shatter when using the pneumatic devices to extract or insert a cork.

In conclusion, the present invention simply and efficiently improves upon the prior art system without significant cost or disadvantage. While this is a complete description of a preferred embodiment of the invention, use of various alternatives, changes or equivalents is possible. For example, an operator may use or substitute different gases and different cork extracting or cork insertion apparatuses. It is possible to add airlocks to an entry door. Apertures may be added to two sides of the compartment, permitting two operators to remove and insert corks within the single compartment. A smaller door, with an airlock, permits sample tasting while a wine is open within the compartment. Therefore, the above description does not limit the scope of the invention defined by the appended claims.

What is claimed is:

1. An apparatus for resealing a wine bottle container having a cork, comprising:
   a closable compartment for segregating a first volume from a second volume with a wine bottle provided within said first volume;
   means, coupled to said closable compartment, for displacing oxygen from within said first volume using an inert gas heavier than air;
   an indicator, coupled to said first volume, for indicating when said oxygen has been displaced to a predetermined level;
   means, provided inside said first volume, for uncorking, within said first volume, said wine bottle while said oxygen is displaced to said predetermined level using an inert gas that is heavier than air; and
   means, provided inside said first volume, for recorking, within said first volume, said wine bottle while said oxygen is displaced to said predetermined level.

2. The recorking apparatus of claim 1 wherein said inert gas comprises a gaseous mixture of nitrogen and carbon dioxide without a significant amount of oxygen, and said oxygen is displaced to less than about 0.4% oxygen in said closable compartment.

3. The recorking apparatus of claim 1 wherein said displacing means includes said closable compartment with an upwardly disposed aperature for venting of oxygen and a downwardly disposed aperature for introduction of said inert gas.

4. The recorking apparatus of claim 1 wherein said uncorking means includes a needle for introducing said inert gas under pressure into a sealed wine bottle to extract the cork.

5. The recorking apparatus of claim 1 wherein said uncorking means and said recorking means are pneumatically-driven by said inert gas.

6. The recorking apparatus of claim 4 wherein said uncorking means and said recorking means are pneumatically-driven by said inert gas.

7. A method of recorking an aged wine in a bottle sealed with a first cork, comprising the steps of:
   providing a wine bottle, sealed with a first cork and containing an aged wine, within a closable compartment which segregates a first volume within said compartment from a second volume outside said compartment;
   sealing said sealed wine bottle within said closable compartment;
   displacing oxygen from said first volume to a predetermined level by use of an inert gas that is heavier than air;
   extracting said first cork from said wine bottle, sealed within said closable compartment, while said oxygen is displaced; and
   inserting a second cork into said wine bottle, sealed within said closable compartment, while said oxygen is displaced.

8. The recorking method of claim 7 further comprising the steps of:
   providing a sealed topping bottle, containing a topping wine, within said closable compartment;
   uncorking said topping bottle within said closable compartment;
   sampling said topping wine from within said closable compartment while said oxygen is displaced; and
   topping a wine level in said wine bottle to a desired topping level while said wine bottle is within said compartment and said oxygen is displaced from said first volume.

9. The recorking method of claim 7 wherein said oxygen is displaced to a level less than about 0.4% oxygen.

10. The recorking method of claim 7 further comprising the step of:
    sampling said aged wine within said wine bottle, sealed within said closable compartment, after said oxygen displacing step and before said second cork inserting step.

11. The recorking method of claim 6 further comprising the step of:
    sampling said aged wine within said wine bottle, sealed within said closable compartment, after said oxygen displacing step and before said topping step.

12. The recorking method of claim 7 wherein said displacing step includes displacing said oxygen with a mixture of nitrogen and carbon dioxide.

13. A wine recorking apparatus, comprising:
    an enclosure for segregating a first volume within said enclosure from a second volume outside said enclosure, said enclosure including a first aperture upwardly disposed to vent oxygen in said first volume and a second aperture downwardly disposed for introduction of an inert gas that is heavier than air, and further including a closable door through which a corked wine bottle containing an wine sealed with a cork is added to said first volume; and
    an oxygen meter, coupled to said enclosure, for measuring and indicating a concentration of oxygen within said first volume.

14. The wine recorking apparatus of claim 13 further comprising:
    a decorker, within said first volume, including a needle to introduce said inert gas into a head space of said wine bottle to extract said cork; and
    a recorker, within said first volume, for compressing a second cork and inserting said compressed cork in said wine bottle to seal said bottle with said second cork.

15. The wine recorking apparatus of claim 14 wherein said decorker and said recorker are pneumatically-driven by inert gas.

16. A method for recorking wine within a wine bottle sealed with a cork, comprising the steps of:
    adding the sealed wine bottle to an air-tight enclosure having a sealable door, an upwardly disposed aperture for venting oxygen from within said enclosure and a downwardly disposed aperture for introduction of an inert gas that is heavier than air;
    sealing the wine bottle within said enclosure;
    displacing oxygen within said enclosure by introducing a heavier than air gas to said enclosure through said downwardly disposed aperature;
    using an oxygen meter to measure and indicate an oxygen concentration within said enclosure;
    extracting the cork from the wine bottle when said oxygen meter indicates that said oxygen concentration is less than a predetermined value; and
    recorking the wine bottle with a second cork when the wine bottle is sealed within said enclosure and said oxygen concentration is less than said predetermined value.

17. The recorking method of claim 16 wherein said extracting step uses and extractor including a needle for introducing a pressurized inert gas into ahead space of the wine bottle to extract the cork.

18. The recorking method of claim 16 wherein said extracting and recorking steps use pneumatically-driven devices operated by an inert gas.

* * * * *